United States Patent
Yen et al.

(10) Patent No.: US 7,194,514 B1
(45) Date of Patent: Mar. 20, 2007

(54) STRIPPING EMAIL ATTACHMENT FROM AN EMAIL MESSAGE AND ADDING INTO THE EMAIL MESSAGE A LINK TO FETCH THE ATTACHMENT

(75) Inventors: Wei Yen, Los Altos Hills, CA (US); John Princen, Cupertino, CA (US)

(73) Assignee: BroadOn Communications Corp., Palo Alto, CA (US)

( * ) Notice: Subject to any disclaimer, the term of this patent is extended or adjusted under 35 U.S.C. 154(b) by 789 days.

(21) Appl. No.: 09/916,634

(22) Filed: Jul. 26, 2001

(51) Int. Cl.
*G06F 13/00* (2006.01)

(52) U.S. Cl. .................................. 709/206

(58) Field of Classification Search ............... 709/204, 709/206, 207, 201, 205, 217, 245; 707/10
See application file for complete search history.

(56) References Cited

U.S. PATENT DOCUMENTS

| | | | | |
|---|---|---|---|---|
| 5,781,901 A | * | 7/1998 | Kuzma | 707/10 |
| 5,903,723 A | * | 5/1999 | Beck et al. | 709/200 |
| 6,785,712 B1 | * | 8/2004 | Hogan et al. | 709/206 |
| 2002/0016818 A1 | * | 2/2002 | Kirani et al. | 709/203 |
| 2002/0059384 A1 | * | 5/2002 | Kaars | 709/206 |

OTHER PUBLICATIONS

Jorg Nonnenmacher and Ernst W. Biersack. "Asynchronous Multicast Push: AMP". Institut Eurecom, 06904, Sophia Antipolis Cedex, France. XP000753920.

Pablo Rodriguez, Keith W. Ross, Ernst W. Biersack. "Improving the WWW: Caching or Multicast? "Institut Eurecom, 2229, route des Crestes, BP 193,06904, Sophia Antipolis, France. Computer Networks and ISDN Systems 30 (1998) 2223-2243.

Zheng Wang, Jon Crowcroft. "Prefetching in World Wide Web". Department of Computer Science, University College London, London, WC1E 6BT, United Kingdom. XP0010220168.

* cited by examiner

*Primary Examiner*—Robert B. Harrell
(74) *Attorney, Agent, or Firm*—Perkins Coie LLP; William F. Ahmann

(57) ABSTRACT

The invention provides a method and system for delivering relatively large documents (such as for example media documents) with reduced use of time and other resources. Relatively large documents sent by a sender to a recipient in an email message are delivered separately from the email message, asynchronously from delivery of the email message or its presentation to the recipient, and using an out-of-band technique separate from email message delivery. This provides for relatively rapid and reliable delivery of the email message, separate reliable delivery of the media document, and presentation of the media document to the recipient without further sending delay. Pre-probing of destination devices may occur to determine a preferred set of characteristics to manage delivery.

18 Claims, 2 Drawing Sheets

STRIPPING EMAIL ATTACHMENT FROM AN EMAIL MESSAGE AND ADDING INTO THE EMAIL MESSAGE A LINK TO FETCH THE ATTACHMENT

RELATED APPLICATIONS

Inventions described herein can be used in conjunction with inventions described in the following documents:

U.S. patent application Ser. No. 09/680,541, filed Oct. 4, 2000, entitled, "Replacement of Requested Data with Equivalent Data." This patent application is still pending.

U.S. patent application Ser. No. 09/684,384, filed on Oct. 4, 2000, entitled, "Adaptive Predictive Delivery of Information." This patent application is still pending.

U.S. patent application Ser. No. 09/732,519, filed Dec. 6, 2000, entitled "A Trusted Gateway Device Serving Multiple Clients Providing Content Storage, Management and Delivery." This patent application is still pending.

These documents are hereby incorporated by reference as if fully set forth herein. These documents are referred to as the "incorporated disclosures."

BACKGROUND OF THE INVENTION

1. Field of the Invention

This invention relates to delivery of embedded media objects.

2. Related Art

In computer communication networks, one method of communication is email ("electronic mail"), in which a sending user prepares and sends a message to a receiving user. Email is well suited to relatively short messages, such as text. However, when the sending user wishes to send a relatively larger amount of information, such as a media document (one example of a media document is a video clip), known email systems are subject to several drawbacks.

A first drawback of known email systems is that a media document can be larger than the maximum size of messages for which the email system is designed. For example, some known email systems are unable to deliver messages longer than about 500 kilobytes in size, while many media documents can be several megabytes in size.

A second drawback of known email systems is that a relatively large media document can take a correspondingly large amount of time (and other resources) to deliver from the sending user to the receiving user. In known email systems, delivery and presentation of the media document to the receiving user is triggered by the receiving user's email client device. The receiving user might therefore be forced to wait a substantial time for the media document to be delivered and be available for presentation. Moreover, if a number of receiving users all attempt to access media documents at substantially the same time, an email server for those receiving users can become overloaded, thus degrading the receiving users' experience further.

Accordingly it would be desirable to have a technique for delivery of embedded media objects, such as for example media documents, that is not subject to drawbacks of the known art.

These advantages and others are provided in an embodiment of the invention, described herein, including a technique in which media documents and other relatively larger documents can be delivered from a sender to a recipient and presented to the recipient with reduced use of time and other resources.

SUMMARY OF THE INVENTION

The invention provides a method and system for delivering relatively large documents (such as for example media documents) with reduced use of time and other resources. Relatively large documents sent by a sender to a recipient in an email message are delivered separately from the email message, asynchronously from delivery of the email message or its presentation to the recipient, and using an out-of-band technique separate from email message delivery. As shown below, this provides for relatively rapid and reliable delivery of the email message, separate reliable delivery of the media document, and presentation of the media document to the recipient without further sending delay.

In a first aspect of the invention, a sender gateway is coupled to the sender. The sender gateway replaces the media document in the email message with a link, and caches that media document for delivery to the recipient using an out-of-band (non-email) technique, such as the FTP or HTTP protocols. The sender gateway delivers the media document to the recipient asynchronously from delivering the email message to the recipient, using one of several possible techniques: (1) scheduling delivery of the media document separately from delivery of the email message, (2) delivering the media document in response to a separate request message from the recipient, or some combination thereof.

In a second aspect of the invention, a recipient gateway is coupled to the recipient. The recipient gateway cooperates with the sender gateway in providing asynchronous, out-of-band delivery of the media document. In cooperation with the sender gateway, the recipient gateway can receive the media document using an out-of-band technique, such as the FTP or HTTP protocols, and reassociate that media document with the email message. In cooperation with the sender gateway, the recipient gateway can: (1) schedule receipt of the media document separately from receipt of the email message, (2) request delivery of the media document in response to the email message from the sender, (3) cache the media document in anticipation of presenting that media document to the recipient, or some combination thereof.

The invention has general applicability to sending and receiving relatively larger documents (including without limitation, media documents, attached documents, and the like) in association with relatively short messages (including without limitation email, "instant messaging," and the like). There is no particular limitation of the invention specifically to media documents or to email messages, nor is the invention necessarily related to the specific applications disclosed herein.

DESCRIPTION OF THE PREFERRED EMBODIMENT

The invention is described herein with regard to preferred steps and data structures. Those skilled in the art will recognize, after perusal of this application, that the described steps and data structures are not limited to any particular circuits. Rather, those of ordinary skill in the art would be able to implement the described steps and data structures, and equivalents thereof, without undue experimentation or further invention. All such implementations are within the scope and spirit of the invention.

Lexicography

The following terms refer or relate to aspects of the invention as described below. The descriptions of general meanings of these terms are not intended to be limiting, only illustrative.

out-of-band—In general, a technique or mode of operation different from that which is normally used. For example, where an email may normally be used to transfer data; data may be transferred using File Transfer Protocol (FTP). In this case FTP is an out-of-band technique.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

Figure 1:
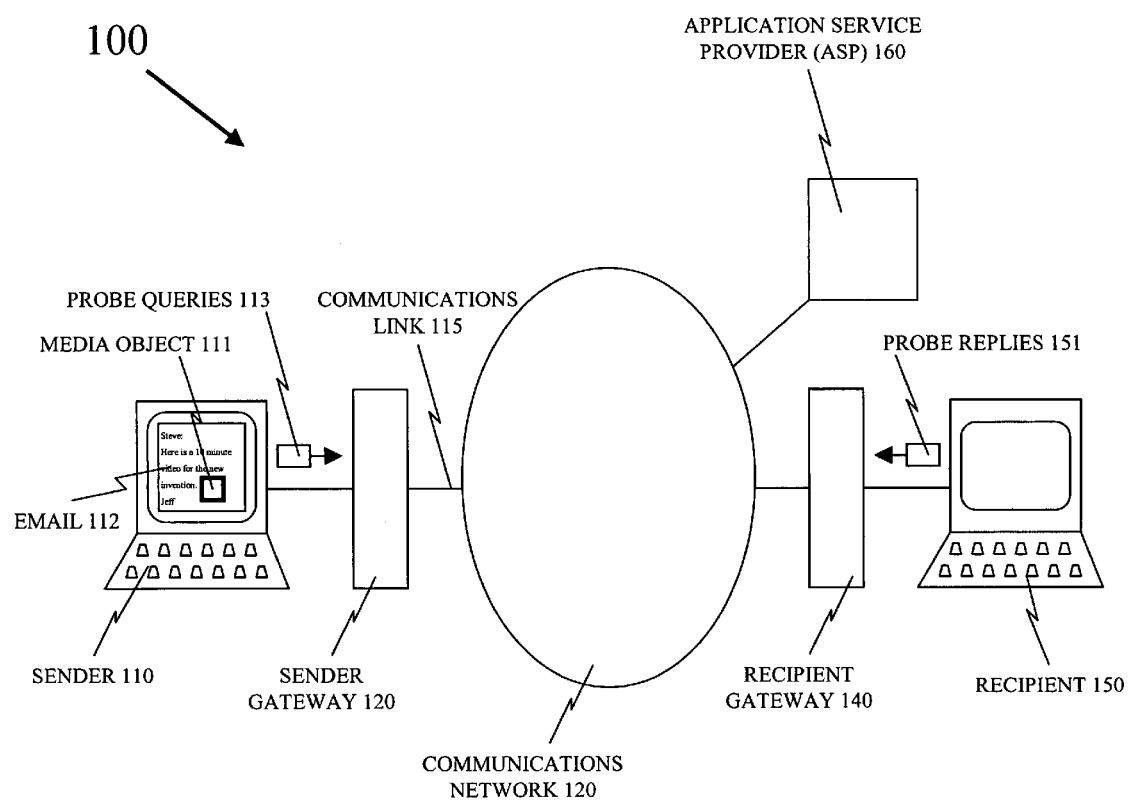
FIG. 1 shows a block diagram of a system for asynchronous out-of-band delivery of embedded media objects.

FIG. 1 shows a block diagram of a system for asynchronous out-of-band delivery of embedded media objects.

A system 100 includes a sender 110, a sender gateway 120, a communications network 130, a recipient gateway 140, a recipient 150, and an application service provider 160.

The sender 110, includes a processor, program and data memory, mass storage, an input device, an interface device capable of coupling with a communications link 115, and program software. The sender 110 preferably includes a personal computer or similar device. The program software enables the sender 110 to perform the function of exchanging data with external devices.

The communications link 115 operates to couple the sender 110 and all other devices either directly or indirectly to the communications network 130.

A sender gateway 120 includes a processor, program and data memory, mass storage, an interface device capable of coupling with the communications link 115, and program software. A gateway is a network point that acts as an entrance to another network. The sender gateway 120 operates to provide an entrance ("gateway") from the network of the sender 110 to other networks, such as the network of the recipient 150. Gateways are known in the art.

In a preferred embodiment, the sender 110 and the sender gateway 120 are separate devices, however, in alternative embodiments the sender 110 and the sender gateway 120 may be the same device. Moreover, in further alternative embodiments the sender 110 (and sender gateway 120, if any) can be the same device as the recipient 150 (and recipient gateway 140, if any).

A communications network 130 includes at least a portion of a communication network, such as a LAN, a WAN, the Internet, an intranet, an extranet, a virtual private network, a virtual switched network, or some combination thereof. In a preferred embodiment, the communication network 130 includes a packet switched network such as the Internet, as well as (in addition to or instead of) the communication networks just noted, or any other set of communication networks that enable the elements described herein to perform the functions described herein.

The recipient gateway 140, similar to the sender gateway 120, includes a processor, program and data memory, mass storage, an interface device capable of coupling with the communications link 115, and program software. The recipient gateway 140 operates to provide an entrance ("gateway") from the network of the recipient 150 to other networks, such as the network of the sender 110.

As noted above, although the sender gateway 120 and the recipient gateway 140 are shown as separate devices, there is no requirement that they are separate devices. In an alternative embodiment, the sender gateway 120 and the recipient gateway may be the same device.

The sender gateway 120 and the recipient gateway 140 are optional elements of the system 100. In alternative embodiments, the system 100 may be configured with either the sender gateway 120, the recipient gateway 140, both or neither. In embodiments where the sender gateway 120 is not present, the sender 110, the recipient gateway 140, the ASP 160 or some combination may provide its functions. In embodiments where the recipient gateway 140 is not present, the recipient 150, the sender gateway 120, the ASP 160 or some combination may provide its functions.

The recipient 150 includes a processor, program and data memory, mass storage, an input device, an interface device capable of coupling with a communications link 115, and program software. The recipient 150 preferably includes a personal computer or similar device. The program software enables the recipient 150 to perform the function of exchanging data with external devices.

In a preferred embodiment, the recipient 150 and the recipient gateway 140 are separate devices, however, in an alternative embodiment the recipient 150 and the recipient gateway 140 may be the same device.

An application service provider 160 includes a processor, program and data memory, mass storage, an interface device capable of coupling with the communications link 115, and program software. The application service provider (ASP) 160 operates to provide specialized applications remotely located to the user that would be expensive to install and maintain within their own company or on their own computer. Application Service Providers are known in the art.

In a preferred embodiment, a media object 111 includes an electronic data file in a media format such as MPEG2. Media objects are known in the art. An email 112 includes electronic data in a file. Electronic mail (e-mail) is known in the art.

System Operation

Figure 2:
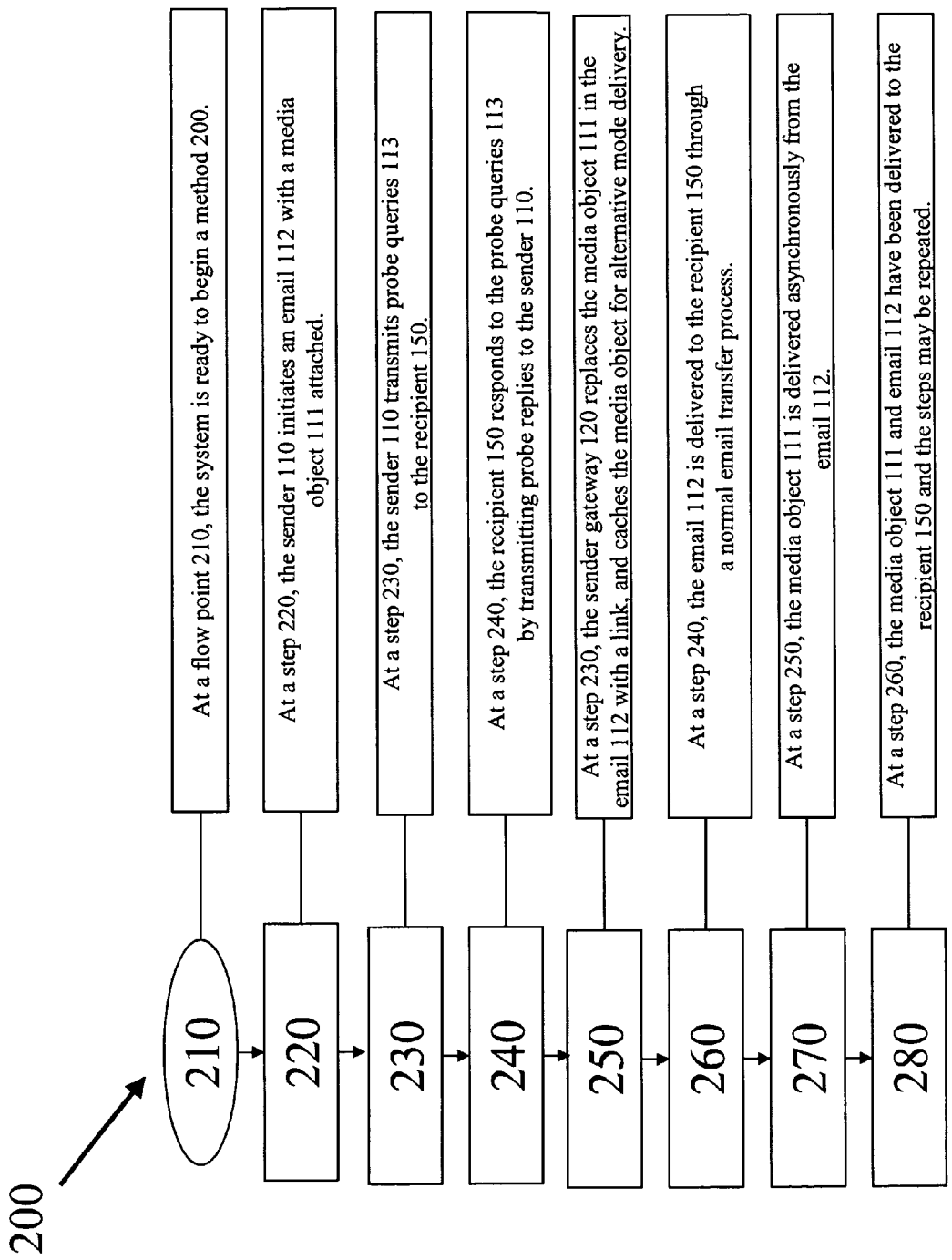
FIG. 2 shows a process flow diagram for asynchronous out-of-band delivery of embedded media objects.

FIG. 2 shows a process flow diagram for asynchronous out-of-band delivery of embedded media objects.

A method 200 is performed by the system 100. Although the method 200 is described serially, the steps of the method 200 can be performed by separate elements in conjunction or in parallel, whether asynchronously, in a pipelined manner, or otherwise. Similarly, although the method 200 is described as being performed by separate elements, these separate elements can be combined. Lastly, there is no particular requirement that the method 200 be performed in the same order in which this description lists the steps, except where so indicated.

At a flow point 210, the system 100 is ready to begin performing a method 200.

At a step 220, the sender 110 initiates an email 112 with a media object 111 attached. The sender 110 composes an email 112 addressed to the recipient 150 and attaches a media object 111 to the email 112. Generally, this is achieved using an email program such as Microsoft Outlook or Netscape Navigator.

At a step 230, the sender gateway 120 replaces the media object 111 with a link (also known as a hypertext link) and caches the media object 111 at the sender gateway 120 for delivery to the recipient 150 using an out-of-band (non-email) technique. In a preferred embodiment, delivery of the media object 111 is separate from the email 110 using a protocol that can reliably transfer large files such as File Transfer Protocol (FTP) or Hypertext Transfer Protocol (HTTP). Generally, delivery of the media object 111 will be at a different time than the email 122 (asynchronous transmission), however it may occur simultaneously.

At a step 240, the email 112, excluding the media object 111, is delivered to the recipient 150 through a normal electronic mail transfer. The recipient 150 does not have to wait long from the time that the email 112 is sent. The email 112 is delivered quickly. Using the current state of the art, the recipient 150 would have to wait an extraordinary amount of time while the email 112 and the large attached media object 111 are delivered together.

At a step 250, the media object 111 is delivered asynchronously from the email 112 to a location close to the recipient 150, such as the recipient gateway 140, the recipient 150 itself, or a relatively nearby caching server. This delivery may be triggered automatically by the sender 110, sender gateway 120, recipient gateway 140, recipient 150, or ASP 160 depending on the elements present in the system 100 as detailed in the alternative embodiments herein.

When the recipient 150 chooses to view the media object 111, the object is transferred from its relatively close cached location to the recipient 150. Since the cached location is functionally closer to the recipient 150 than the sender 110, and the network connecting the recipient 150 and the cached location can potentially be much higher speed, the final transfer of the media object 111 is relatively fast.

At a step 260 the email 112 has been delivered, and at the discretion of the recipient 150 the media object 111 and email 112 have been viewed.

At this step 260 the method 200 has completed and may be repeated.

System Configurations

The invention is flexible with regard to its implementation. In one embodiment the system 100 includes all the elements illustrated in FIG. 1 except the ASP 160. As previously mentioned, the sender gateway 120 and the recipient gateway 140 may also be optional. In alternative embodiments, the system 100 includes the core elements of a sender 110, media object 111, email 112, communications network 130, and recipient 150. In addition to these elements, an alternative embodiment may use any combination of the sender gateway 120, recipient gateways 140, and ASP 160.

In a first alternative embodiment an ASP 160 is used. The email 112 and media object 111 are sent to the ASP 160. The ASP 160 strips the media object 111 from the email 112 and delivers the email to the recipient 150. The media object 111 is then delivered using an out-of-band transfer technique to a location relatively local to the recipient 150. This location may be a caching server in the network, the recipient gateway 140, or the recipient 150.

In a second alternative embodiment no sender gateway 120 or ASP 160 is used. The sender 110 initiates an email 112 with an attached media object 111. The email 112 is delivered through the standard e-mail delivery process with an embedded link to the media object 111 and the media object 111 is delivered out-of-band to a location close to the recipient 140.

In a third alternative embodiment the sender 110 or sender gateway 120 may send a probing signal to one or both of the recipient 150 and ASP 160 to determine the best method of delivery. For example, the probe may determine whether there is an intermediate location where the media object 111 may be cached close to the recipient gateway 140, recipient 150, or ASP 160. The probe may also be used to detect the transfer protocol and media object 111 format preferred by the recipient 150. The sender 110 or sender gateway 120 may then reformat the media object 111 and use the suggested protocol and route to deliver the media object 111.

In a fourth alternative embodiment the recipient gateway 140 checks received email 112 automatically on a regular basis for any links to media objects 111 embedded in the email 112. Thus, it may pre-cache any links contained in the email 112.

In a fifth alternative embodiment the sender gateway 140 separates the media object 111 from the email 112, caches the media object 111 locally, and inserts a link into the email 112 through which the media object 111 may be accessed. This allows the recipient 150 or any intermediate device (such as, the recipient gateway 140 or ASP 160) to access the media object 111 on demand once the email 112 has been received.

Generality of the Invention

The invention has general applicability to sending and receiving relatively large documents in association with relatively short messages.

The invention claimed is:

1. A method for sending electronic mail, including
separating at least one attachment from a text portion in an electronic mail message sugh that a link is created between said at least one attachment and said text portion;
delivering said at least one attachment at a time other than when said text portion is delivered;
using a non-email transfer protocol to deliver said at least one attachment;
obtaining from a recipient a preferred method for delivery; making said at least one attachment available from said text portion;
publishing said at least one attachment at a location relatively local to said recipient;
initiating a fetch for said at least one attachment;
fetching said at least one attachment;
presenting said at least one attachment to said recipient; and
scanning said electronic mail automatically on a regular basis for one of said links embedded in said electronic mail message and pre-fetching an associated attachment to be cached at a location relatively local to said recipient.

2. The method of claim 1, wherein said publishing occurs at some combination of: (1) a sender gateway, (2) an application service provider, and (3) a recipient gateway.

3. The method of claim 1, wherein said initiating is directed at some combination of: (1) a sender gateway, (2) an application service provider, and (3) a recipient gateway.

4. The method of claim 1, wherein said at least one attachment is located at its cached location and transferred to said recipient.

5. The method of claim 1, wherein said at least one attachment has been predownloaded to said recipient.

6. The method of claim 1, wherein said scanning is performed by some combination of: (1) a sender gateway, (2) an application service provider, and (3) a recipient gateway.

7. The method of claim 1, wherein said obtaining further includes probing the recipient to ascertain at least one caching location and transferring said at least one attachment using said at least one caching location responsive to said probing.

8. The method of claim 1, wherein said obtaining further includes probing the recipient to ascertain at least one transfer protocol for delivery of said at least one attachment and transferring said at least one attachment using said at least one transfer protocol responsive to said probing.

9. An apparatus for sending electronic mail, including
means for separating at least one attachment from a text portion in an electronic mail message such that a link is created between said at least one attachment and said text portion;
means for delivering said at least one attachment at a time other than when said text portion is delivered;
means for using a non-email transfer protocol to deliver said at least one attachment;
means for obtaining from a recipient a preferred method for delivery;
means for making said at least one attachment available from said text potion;
means for publishing said at least one attachment at a location relatively local to said recipient;
means for initiating a fetch for said at least one attachment;
means for fetching said at least one attachment;
means for presenting said at least one attachment to said recipient; and
means for scanning said electronic mail automatically on a regular basis for one of said links embedded in said electronic mail message and means for pre-fetching an associated attachment to be cached at a location relatively local to said recipient.

10. The apparatus of claim 9, wherein said means for publishing occurs at some combination of: (1) a sender gateway, (2) an application service provider, and (3) a recipient gateway.

11. The apparatus of claim 9, wherein said means for initiating is directed at some combination of: (1) a sender gateway, (2) an application service provider, and (3) a recipient gateway.

12. The apparatus of claim 9, wherein said at least one attachment is located at its cached location and transferred to said recipient.

13. The apparatus of claim 9, wherein said at least one attachment has been predownloaded to said recipient.

14. The apparatus of claim 9, wherein said means for scanning is performed by some combination of: (1) a sender gateway, (2) an application service provider, and (3) a recipient gateway.

15. An apparatus for sending electronic mail, including
means for separating at least one attachment from a text portion in an electronic mail message such that a link is created between said at least one attachment and said text portion;
means for delivering said at least one attachment at a time other than when said text portion is delivered;
means for using a non-email transfer protocol to deliver said at least one attachment;
means for obtaining from a recipient a preferred method for delivery;
means for making said at least one attachment available from said text portion,
wherein said means for obtaining further includes means for probing the recipient to ascertain at least one caching location and means for transferring said at least one attachment using said at least one caching location responsive to said means for probing.

16. The apparatus of claim 15, wherein said means for obtaining further includes means for probing the recipient to ascertain at least one transfer protocol for delivery of said at least one attachment and means for transferring said at least one attachment using said at least one transfer protocol responsive to said means for probing.

17. A computer implemented method comprising:
separating an attachment from an email massage;
forming a linked email message comprising the email message and a link to the attachment;
probing a recipient for a method of delivery;
delivering the linked email message;
delivering the attachment according to the method of delivery in response to execution of the link in the linked email;
caching said attachment at an intermediate location.

18. The method of claim 17, wherein said recipient is selected from the group consisting of a recipient, recipient gateway, and an application service provider.

* * * * *